United States Patent [19]
Yuan

[11] 3,936,013
[45] Feb. 3, 1976

[54] VORTEX CONTROL

[76] Inventor: Shao Wen Yuan, 2021 Highboro Way, Falls Church, Va. 22043

[22] Filed: Dec. 17, 1973

[21] Appl. No.: 425,143

[52] U.S. Cl.......... 244/40 A; 114/66.5 H; 416/90 A
[51] Int. Cl.² ........................................ B64C 23/06
[58] Field of Search.... 244/40 R, 40 A, 42 R, 42 C, 244/42 CC, 130, 17.19; 416/20, 90 R, 90 A, 92; 415/DIG. 1; 114/66.5 H, 67 A

[56] References Cited
UNITED STATES PATENTS

| | | | |
|---|---|---|---|
| 1,775,757 | 9/1930 | Gay | 244/42 CC |
| 2,477,461 | 7/1949 | Lee | 244/40 A X |
| 3,025,026 | 5/1962 | Nichols | 244/42 CC X |
| 3,446,288 | 5/1969 | Yuan | 416/90 A |
| 3,580,693 | 5/1971 | Cheeseman et al. | 416/90 A |
| 3,692,259 | 9/1972 | Yuan | 244/40 R |

*Primary Examiner*—Trygve M. Blix
*Assistant Examiner*—Barry L. Kelmachter

[57] ABSTRACT

This invention is for wings of all types, such as fixed wings for aircraft and hydrofoil boats, and rotary blades (or wings) for helicopters and turbines, to be equipped with a slotted tube, or a tube with series of holes extending outwardly in the spanwise direction near the trailing edge of the wing tip for blowing jets of fluid (such as air or water) in the direction opposite to the lift of the wing, thereby achieving flow in the form of a jet sheet to abate, diffuse and break up the undesirable wing-tip or blade-tip vortices.

19 Claims, 11 Drawing Figures

U.S. Patent February 3, 1976 Sheet 1 of 2 3,936,013
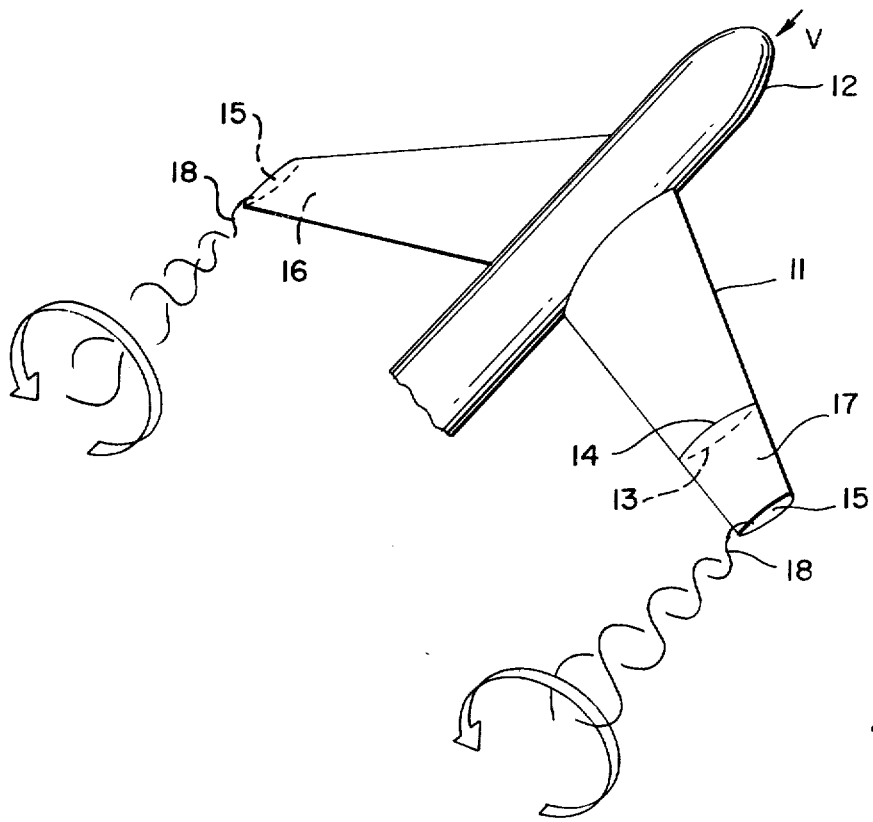
FIG. 1
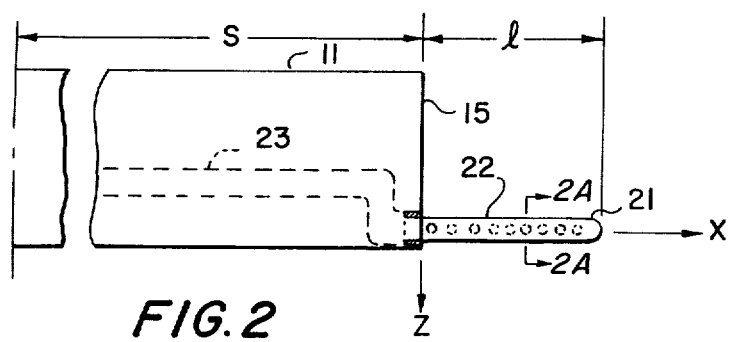
FIG. 2
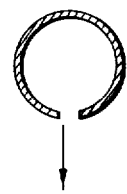
FIG. 2A
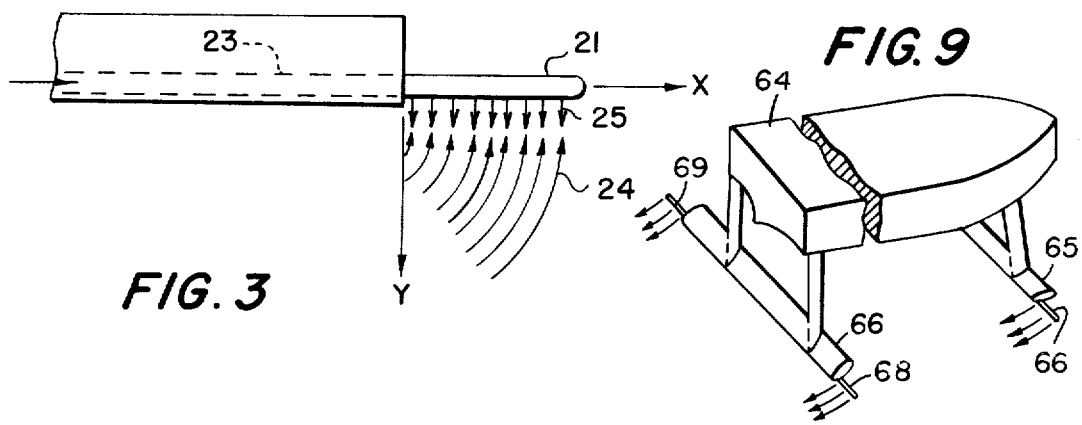
FIG. 3
FIG. 9

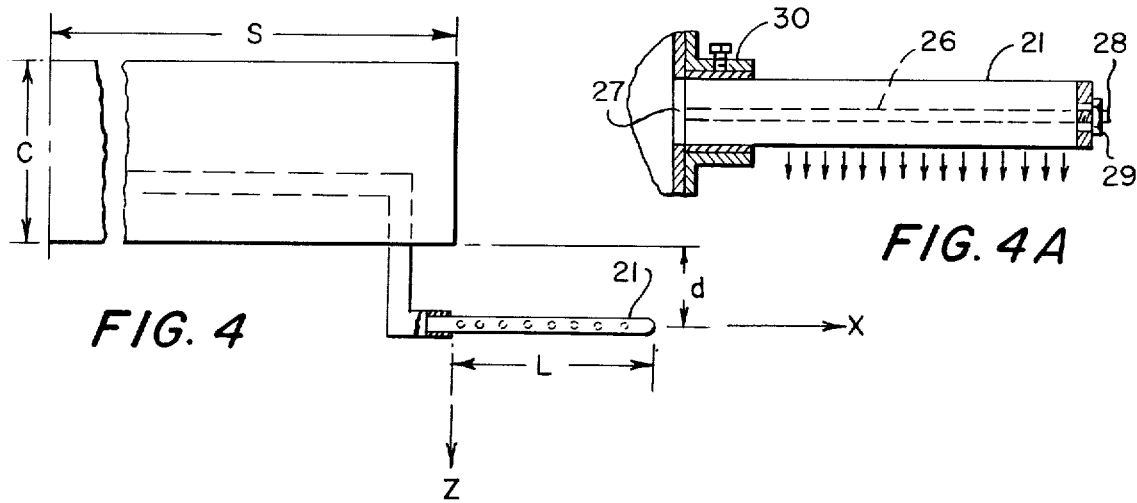
FIG. 4
FIG. 4A
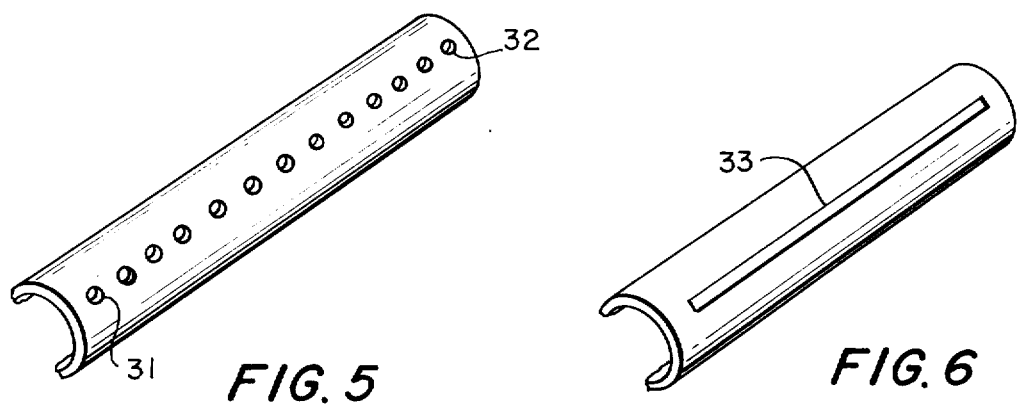
FIG. 5
FIG. 6
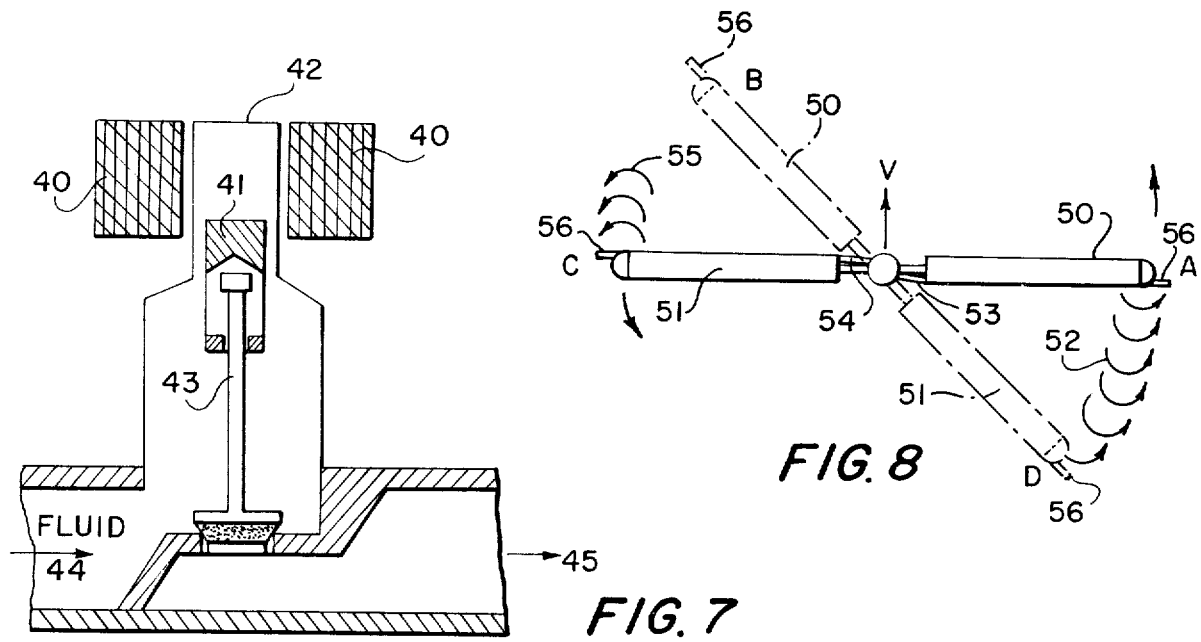
FIG. 7
FIG. 8

VORTEX CONTROL

SUMMARY OF INVENTION

This invention relates to vortex control devices for lifting surfaces of practically all types, particularly crafts with stationary wing such as airplanes, hydrofoil boats, amphibians, air cushion crafts, and the like for supporting, stabilizing, and controlling the craft, and crafts with rotary wings or blades such as helicopters, propellers, turbines, compressors and the like for supporting, stabilizing, controlling and propelling the craft. The lifting surfaces include wing, flap, rudder, stabilizer, tab, rotating blade and the like. I define "wing" as a structural member of a vehicle or machine which moves relatively to a fluid such as air, exhaust gas and water hence a force, lift or thrust, is generated in the direction perpendicular to the fluid motion for supporting, stabilizing, and controlling the craft. By way of illustration, this invention will, however, be shown and described mostly as incorporated in an aircraft with suitably attached wings to which this invention has distinct advantage.

It is well known that every heavier-than-air craft generates wake turbulence in the form of a vortex trailing behind the lift surface of the craft or wing-tip vortices whenever its wings are generating lift. The strength of the vortices depends directly on the weight of the airplane that generates them, and the speed at which it is flying.

As the big jets approach or take off from airports, their wings leave behind two churning cylinders of air that some pilots say have the wallop of a cyclone. This swath of wind, called "wake turbulence," is posing frustrating problems for air safety officials.

Accident investigators have documented many cases in which a pilot lost control of his plane after encountering turbulence caused by a craft just ahead of him. They have also cited cases of crop-duster pilots crashing after running into wake turbulence from their own planes.

Safety experts say that the recent proliferation of large jets such as the Boeing 747, the DC–10 and the lockheed Tri-Star have increased the hazards substantially. The heavier a plane is, the greater the turbulence it creates.

Researchers have learned that the dual wakes from big jets are each usually eight to ten feet wide, tubular-shaped and counter-rotating at a velocity of 100 to 200 feet or more per second.

The same adverse situation occurs in water where the wing-tip vortices are generated, for example, by hydrofoil.

In the case of rotary-wing aircrafts, in addition to the above-mentioned disturbance, the following blade which passes over the vortices generated by the preceding blade undergoes a severe impulsive loading. This is one of the major sources of helicopter rotor noise which is often referred to as blade slap. In addition to the above-mentioned adverse aspects of wing-tip vortices, it also causes a reduction of lift per unit span due to tip loss.

In the past, the solution to the problems of wing-tip vortices hazard are merely wide aircraft separations in time and space; i.e., maintaining some two-minute or five-mile separation when following a heavy airplane on the same runway. Currently, the National Transportation Safety Board, after investigating last year's DC-9 crash in Texas, called for a minimum of at least three minutes, an equivalent of about seven miles. These restrictions would reduce the hourly flow of airplanes to runway by some 15 percent, thereby severely limiting operation at major airports. Unless we solve the wake turbulence problem, with the trouble there has been in building new airports in the past few years, we are going to have serious problems of capacity in a few years.

The prior device (Yuan, U.S. Pat. No. 3,692,259) dealing with this problem consists of a round wing-tip provided with at least one slot in a conduit extending along the clockwise direction of the wing tip for blowing jets of air at pre-selected locations along well chosen directions, thereby achieving circulation to counterbalance the undesirable wing-tip vortices.

The present invention provides new and improved means for blowing jets to counterbalance the undesirable wing-tip vortices regardless of the shape and thickness of the wing tip.

For accomplishing the foregoing object, the invention contemplates the use of a wing tip which is provided with a slotted tube, or a tube with series of holes extending outwardly in the spanwise direction near the trailing edge of the wing tip for blowing jets of air along well chosen directions, thereby achieving flow in the form of a jet sheet to counterbalance and break up the undesirable wing-tip vortices.

Accordingly, an important object of the invention is to diminish or abate the above-described air or water disturbances, particularly vortices, created by moving wings in fluids.

Another object is to provide fixed- and rotary-wing aircrafts or other rotary machines with novel jet means to gain jet momentum and hence to increase the lift per unit span.

A further object is to provide, for a wing or a rotor-blade tip, blowing jets having control means for changing the magnitude of the jet momentum and thereby counterbalancing the variable strength of the undesirable wing-tip vortices.

A still further object is to provide at various locations behind the wing tip, generally in the regions of strong vortex strength, an extended tube for blowing jets for effectively breaking up the wing-tip vortex formation.

A still further object is to provide a new means for producing an intermittent tip blowing jet for effectively breaking up the wing-tip vortex formation and hence its strength.

Still another object is to provide a means for cyclically altering the tip jet momentum of rotor blades during the forward flight of a VTOL craft for counterbalancing the cyclically varying wing-tip vortices produced by the rotor blades.

Further objects and advantages of my invention will appear as the specification proceeds.

REFERENCE TO DRAWINGS

The preferred forms of the invention are illustrated in the accompanying drawings, in which:

FIG. 1 is a diagrammatic view of an aircraft and trailing wing-tip vortices;

FIG. 2 is a plan view (X–Z plane) of a wing tip or rotor-blade tip employing this invention;

FIG. 2A is an enlarged side sectional view taken on line 2A—2A of FIG. 2;

FIG. 3 is a rear view (X–Y plane) of wing tip or rotor-blade tip illustrating the counterbalance of blowing jets and wing-tip vortex flow;

FIG. 4 is a modified arrangement of an extended tube for blowing jet employing this invention;

FIG. 4A shows a control for rotating the angle of the jet;

FIG. 5 is a perspective view of a bottom portion of an extended tube having a series of holes for blowing jets.

FIG. 6 is a perspective view of a bottom portion of an extended tube having an infinite number of jet openings in the form of a continuous slot;

FIG. 7 shows a valve control for controlling an intermittent jet.

FIG. 8 is a top plan view of a rotor blade system without the main body portion and including symbols illustrating wing-tip vortices.

FIG. 9 is a fragmentary perspective view of a marine craft of the type utilizing lift foils.

Referring to FIG. 1, there is shown a wing 11 which is attached to a fuselage 12. When the airplane flies forward, lift is generated by the wing which sustains the weight of the airplane. The production of lift by the wing is the result of a strong positive pressure on the lower surface 13 of the wing and a suction or negative pressure on the upper surface 14 of the wing. Consequently, there is a difference in pressure between the two surfaces of the wing which results in a flow of air around the ends or tips 15 of the wing 11, from the region of higher pressure to the region of lower pressure. Through the motion of the air from the inner portion of the span 16 toward the tips 15 on the lower surface of the wing, and from the tip 15 toward the inner portion on the upper surface 17 of the wing, there are set up wing-tip vortices 18 aligned with the main stream of incoming flow. As the airplane moves forward the wing-tip vortices trail behind and remain in the air for an extended length of time which was previously mentioned.

According to this invention a wing-tip system (see FIGS. 2 and 2A) is provided with at least one extended tube 21 (in the X-direction) for blowing a jet of fluid through an orifice 22. The extended tube 21 is attached to wing 11 but, generally, the term "wing" does not include an extended tube for blowing a fluid jet. Fluid from a fluid source, such as a compressor or a compressed air reservoir (not shown) enters a conduit 23 and ejects from an orifice opening 22 in a downward Y-direction (see FIG. 3) As the airplane moves forward a vortex 24 generated at the right-hand side wing tip 15, in a counterclockwise direction, moves downstream (Z-direction) and passes a plane (X–Y plane) which contains the extended tube 21 and the downward fluid jets 25 ejected therefrom. The spacing and intensity of the blowing jets are so designed as to form a substantially jet sheet acting as a jet knife. In this manner the downward jet flow counterbalances and breaks up the counterclockwise upward flow of the wing-tip vortex. This phenomenum is illustrated in FIG. 3 which is a rear view (X–Y plane) of the wing-tip system. Thus, the present invention uses the jet flow system to abate the circulatory flow created near the wing tip and to alleviate the wing-tip vortices.

FIG. 4 is a modification of the wing-tip vortices control shown in FIGS. 2 and 3. The modification involves placing the extended tube at a location behind the wing (in the Z-direction). Since the formation of the wing-tip vortex depends upon the geometrical shape of the wing planform the location of the extended tube for blowing jets must be designed according to the configuration of the wing planform. This allows the vortex control system of this invention to operate more efficiently for a given configuration of the wing.

In general, the effective length of the extended tube 21 is about 3 to 15 percent of the semi-span length of the wing which may be placed near the trailing edge of the wing tip (see FIG. 2). The "span" of a wing is defined as its length from tip to tip and the semi-span length is the length from the root to the tip. For specific cases it may be desirable to place the extended tube downstream behind the wing tip (in the Z-direction) up to one wing-chord distance. In other words, $0.03 \leq l/s \leq 0.15$ (FIG. 2) and $0 \leq d/c \leq 1.0$ (FIG. 4) or, for example, the dimension of $l$ and $d$ for a Boeing 747 transport is about 3 to 15 feet and zero to 30 feet, respectively. For special cases the extending tube may be attached to the wing tip at a location anywhere between leading and trailing edges.

The rotational velocity of the vortex is known to be inversely proportional to the radius of the vortex. In other words, the greatest rotational velocity is at the core of the vortex and it tends to zero at great distance from the center of the vortex core. Consequently, it is desirable to have jet mass flow along the extended tube varying in accordance with the vortex velocity variation, to improve the efficiency of fluid usage. There are several means to accomplish this variation of mass flow control, one of the simplest yet effective is to vary the jet orifice sizes from which fluid is emitted. FIG. 5 shows the bottom portion (X–Z plane) of the extended tube 21, attached to the wing tip in which the jet-orifice sizes decrease from the largest orifice 31 at one end of the tube to the smallest 32 near the other end of the tube according to the vortex velocity generated at the wing tip. In general, the jet emitted from the orifice of the extended tube is in the downward direction (Y-direction); however, the angle of the jet can be easily adjusted by rotating the tube (see FIG. 2A) before the flight. In FIG. 4A is shown a solid thin rod 26 concentrically located with the extended tube. The rod is rigidly attached to the wing-tip structure 27 at one end and extended out through the tube at the other end 28. The end 28 of the rod is threaded to fit a lock nut. The tube 21 can be rotated with respect to the X-axis by adjusting the lock ring 30 to a required position and set firmly by tightening the lock ring and lock nut. In this manner, the angle of the jet can be pre-set relative to the Z-axis. It can also be adjusted during the flight (not shown).

FIG. 5 discloses a multiplicity of relatively closely spaced jet orifices. Such orifices, if increased to an infinite number, result in a slot 33 as shown in FIG. 6. The width of the slot 33 is made variable according to the variation of orifice size shown in FIG. 5.

In the above description air or gas supply for the fluid jets is made available from a suitable main source in the craft such as a compressor, (not shown) and is conveyed through a conduit to the extended tube near the wing tip. The mass flow of the jet 25 can be increased or decreased by a flow regulator (not shown); however, the maximum jet velocity is limited to sonic velocity because the orifices 22, 31, 32 or 33 are not convergent-divergent. In order to make the system operate more economically yet efficiently, an intermittent blowing jet is introduced. A simple device to accomplish this means is shown in FIG. 7 in which an electrically operated solenoid valve is at the closed position. When the coil 40 is energized by passing electric current, it draws a soft-iron plunger 41 up toward a central position in the coil which in turn lifts the valve to the open position. The fluid is isolated by a brass cup 42 between the coil 40 and the plunger 41. The plunger is loosely attached to the valve stem 43 so this allows the plunger to acquire appreciable velocity before it engages the valve stem 43. When the coil is de-energized, the plunger and valve stem drop by gravity into closed position. Hence, the solenoid valve, illustrated in FIG. 7, is capable of open-and-closed operation at any specified intervals.

The control for the intermittent jet is made by properly regulating the motor speed which in turn regulates the electric switch. When the valve is at open position the air supply enters conduit 44 and emits through conduit 45 to the wing-tip extended tube 21. The jet flow is cut off when the valve is at closed position. In this manner desirable intermittent jet at jet orifice 22 is obtained.

The invention so far has been illustrated mostly in connection with wing-tip vortices control for an airplane. In the case of a marine craft moving in water, the hydrofoil generates very similar, if not identical, vortices at its tip. Furthermore, the marine propellers generate similar tip vortices. In a like manner, my invention described above can be used to alleviate these tip vortices occuring in these marine crafts.

Referring to FIG. 8, there is shown a top view of VTOL rotor with two blades attached. When the VTOL craft is hovering or in vertical ascent, the rotor blades act in a manner similar to that of propeller blades. During its rotation the blade 50 originally at position A moves to a position B, and the blade 51 originally at position C now moves to position D. It can be easily seen that, in the absence of the present invention, the blade 51 at position D encounters the region of vortices 52 which were shed by the blade tip of blade 50. This causes a severe impulsive loading on the following blade 51 which is one of the major sources of VTOL rotor noise (often referred to as blade slap). Simiarly, blade 50 at position B is disturbed by the vortices 55 shed by blade 51. Similar or even worse situations occur for a three-or-more bladed rotor.

When the helicopter (or VTOL) is in hovering or vertical ascent flight condition, the alleviation of the blade-tip vortices can be made in a like manner by what has been disclosed above. This is because the blade sustains the same load at any azimuth position. Further, each of the two blades sustains exactly one-half of the gross weight of the craft. For forward flight the lift force on the blade varies as a harmonic function of the azimuth position. This, in turn, produces cyclical wing-tip vortices. In order to counterbalance the cyclical wing-tip vortices the air supply to the jet orifice of the extended tube 56 can be provided with regulating means (similar to the one shown in FIG. 9 of prior U.S. Pat. No. 3,446,288) for cyclically altering the jet mass flow during the rotation. This gives the desired amount of air flow to the respective jet orifices through pipes 53 and 54 in the blades 50 and 51, respectively, at any given azimuth position.

In FIG. 9, when the boat 64 is in forward motion, lift forces will be generated on the hydrofoils or lift foils 65 and 66 which in turn produce wing-tip vortices. Extended tubes 67, 68, and 69 are attached to the hydrofoil 65 and 66, respectively. Water supply to the jet orifice of the extended tubes 67, 68, and 69 can be produced with a jet pump (not shown) for providing jet mass flow. The function of the tubes for alleviating the wing-tip vortices on hydrofoils is identical to that described in connection with FIGS. 1, 2, 3 and 4 for the airplane wing.

The particular advantages of the wing-tip vortices control applied to aircraft, marine craft and turbomachinery are as follows:

1. To diminish or eliminate the wing-tip vortices in atmosphere and in water which could otherwise endanger other aircraft or marine craft as they enter the wake turbulence.
2. To alleviate the VTOL rotor noise due to blade slap which is one of the serious problems in noise pollution.
3. To reduce the noise and increase the efficiency of most turbo-machineries.

The above-mentioned important features of wing-tip vortices control readily identifies the uniqueness of my invention.

While only several specific embodiments are hereinafter illustrated and described, it is to be expressly understood that this invention is not intended to be limited to the exact formations, constructions, or arrangement of parts as illustrated and described, because various modifications may be developed in putting the invention to practice within the scope of the appended claims.

What the claim is:

1. Apparatus for abating wing-tip vortices formed at the tips of a wing when it is in a fluid stream flowing relative to said wing, said vortices being formed as a result of a difference in fluid pressure on one side of the wing relative to the fluid pressure on the opposite side of the wing which causes a rush flow of fluid from the side of higher pressure to the side of lower pressure, said apparatus comprising a wing having at least a pair of wing tips, a source of pressurized fluid, a plurality of jetting means, and means connecting said jetting means to said source of pressurized fluid, each of said plurality of jetting means of being located outwardly of a respective one of said tips for simultaneously emmiting pressurized fluid from said jetting means in the direction toward said side of higher pressure and in a plane substantially perpendicular to the direction of flow of said fluid stream, said wing including a leading edge and a trailing edge, said fluid stream which flows relative to said wing passing from the leading edge toward said trailing edge, and said jetting means are located downstream of the position of the mid-chord of said tips which lies halfway between said leading and trailing edges.

2. Apparatus as defined in claim 1 wherein said jetting means includes means for continuously emitting said pressurized fluid.

3. Apparatus as defined in claim 1 wherein said jetting means includes a tube having fluid port means formed therein for emitting said pressurized fluid, and said tube extends outwardly from a respective wing tip in the spanwise direction.

4. Apparatus as defined in claim 3 wherein said fluid port means extends in the spanwise direction and has a length between approximately 3 and 15 percent of the semi-span length of said wing.

5. Apparatus as defined in claim 3 wherein said fluid port means comprises a slot.

6. Apparatus as defined in claim 3 wherein said fluid port means comprises a plurality of orifices extending in a line along said tube.

7. Apparatus as defined in claim 3 wherein said tube is located downstream from said wing.

8. Apparatus as defined in claim 1 wherein said jetting means includes a tube having fluid port means formed therein for emitting said pressurized fluid, and said tube is located downstream from said trailing edge up to a distance approximately equal to a length measured between said leading edge and said trailing edge.

9. Apparatus as defined in claim 5 wherein said slot varies in width along said tube.

10. Apparatus as defined in claim 6 wherein said plurality of orifices are of varying sizes.

11. Apparatus as defined in claim 1 wherein said jetting means includes means for adjusting the angular direction of the emitted pressurized fluid with respect to a plane parallel to the wing planform.

12. Apparatus as defined in claim 3 including means for rotating said tube about its longitudinal axis for adjusting the angular direction of the emitted pressurized fluid with respect to the direction of flow of said fluid stream.

13. Apparatus as defined in claim 1 wherein said jetting means includes means for intermittently emitting said pressurized fluid according to a predetermined time sequence.

14. Apparatus as defined in claim 1 wherein said wing is a portion of a fixed-wing aircraft, and said wing is attached to a fuselage of said aircraft.

15. Apparatus as defined in claim 1 wherein said wing is a portion of a rotary-wing aircraft of the type including rotary blade means and said wing is said rotary blade means.

16. Apparatus as defined in claim 1 wherein said wing is a portion of a boat of the type including a lift foil, and said wing is said lift foil.

17. A method for abating wing-tip vortices formed at the tips of a wing when it is located in a fluid stream flowing relative to said wing, said vortices being formed as the wing which causes a rush flow of fluid from the side of higher pressure to the side of lower pressure, said method comprising the steps of providing a wing having at least a pair of wing tips, providing a supply of pressurized fluid, and simultaneously emitting a jet of said pressurized fluid from a region located adjacent to and outwardly of each of said wing tips in a direction toward said side of higher pressure and in a plane substantially perpendicular to the direction of flow of said fluid stream, said wing including a leading edge and a trailing edge and said fluid stream passes from the leading edge to the trailing edge, and said step of emitting a jet of pressurized fluid comprises emitting said jet at a location downstream of the position of the mid-chord of said tips which lies halfway between said leading and trailing edges.

18. A method as defined in claim 17 wherein said pressurized fluid is emitted in the form of a jet sheet.

19. A method as defined in claim 17 wherein said pressurized fluid is emitted in the form of a plurality of closely spaced discrete streams.

* * * * *